(12) United States Patent
Pan et al.

(10) Patent No.: US 11,258,264 B2
(45) Date of Patent: Feb. 22, 2022

(54) PHOTOVOLTAIC STRING OPTIMIZER

(71) Applicant: ABB Schweiz AG, Baden (CH)

(72) Inventors: Zhiguo Pan, Cary, NC (US); Sandeep Bala, Raleigh, NC (US); Liming Liu, Cary, NC (US); Yuxiang Shi, Raleigh, NC (US)

(73) Assignee: Marici Holdings The Netherlands B.V., Rotterdam (NL)

( * ) Notice: Subject to any disclaimer, the term of this patent is extended or adjusted under 35 U.S.C. 154(b) by 797 days.

(21) Appl. No.: 15/989,667

(22) Filed: May 25, 2018

(65) Prior Publication Data
US 2019/0363540 A1    Nov. 28, 2019

(51) Int. Cl.
*H02J 3/38* (2006.01)
*H02M 1/12* (2006.01)
*H02M 3/155* (2006.01)

(52) U.S. Cl.
CPC ............ *H02J 3/385* (2013.01); *H02M 1/126* (2013.01); *H02M 3/155* (2013.01)

(58) Field of Classification Search
CPC ......... H02J 3/385; H02M 1/126; H02M 3/155
USPC ........................................................ 307/78
See application file for complete search history.

(56) References Cited

U.S. PATENT DOCUMENTS

| | | | |
|---|---|---|---|
| 8,013,472 B2 | 9/2011 | Adest et al. | |
| 8,188,620 B2* | 5/2012 | Ghassemi | H01L 31/02021 307/112 |
| 8,330,299 B2 | 12/2012 | Steigerwald et al. | |
| 9,819,182 B1* | 11/2017 | Batten | H02J 1/102 |
| 2010/0147354 A1* | 6/2010 | Takehara | H02J 3/381 136/244 |
| 2012/0319489 A1 | 12/2012 | McCaslin et al. | |
| 2016/0322825 A1 | 11/2016 | Urry et al. | |
| 2017/0063094 A1 | 3/2017 | Chapman et al. | |
| 2017/0308110 A1* | 10/2017 | Ahmed | G05F 1/67 |
| 2018/0102646 A1* | 4/2018 | Apte | H02J 1/14 |

FOREIGN PATENT DOCUMENTS

WO    2017087988 A1    5/2017

OTHER PUBLICATIONS

Patent Cooperation Treaty, International Search Report and Written Opinion in corresponding application No. PCT/US19/33514, dated Sep. 20, 2019, 10 pp.

(Continued)

*Primary Examiner* — Alfonso Perez Borroto
(74) *Attorney, Agent, or Firm* — Taft Stettinius & Hollister LLP (57) ABSTRACT

Unique systems, methods, techniques and apparatuses of photovoltaic (PV) string power systems are disclosed. One exemplary embodiment is a PV power system comprising a plurality of PV strings and a floating DC-DC optimizer. The floating DC-DC optimizer comprises a first DC bus rail, a second DC bus rail, a plurality of input legs, each leg being coupled across the first DC bus rail and second DC bus rail, including two input leg semiconductor switches coupled at an input terminal, each input terminal being structured to receive an input current from an end of one PV string of the plurality of PV strings, and an output leg including two output leg semiconductor devices coupled at an output terminal.

26 Claims, 4 Drawing Sheets

(56) References Cited

OTHER PUBLICATIONS

R.C.N. Pilawa-Podgurski et al., "Submodule integrated distributed maximum power point tracking for solar photovoltaic applications," IEEE Transactions on Power Electronics, dated Jun. 2013, pp. 2957-2967, vol. 28, No. 6, IEEE.

P.S. Shenoy et al., "Differential power processing for increased energy production and reliability of photovoltaic systems," IEEE Transactions on Power Electronics, dated June 2013, pp. 2968-2979, vol. 28, No. 6, IEEE.

J.T. Stauth et al., "Resonant switched-capacitor converters for sub-module distributed photovoltaic power management," IEEE Transactions on Power Electronics, dated Mar. 2013, pp. 1189-1198, vol. 28, No. 3, IEEE.

D. Shmilovitz et al., "Distributed maximum power point tracking in photovoltaic systems—emerging architectures and control methods," Automatika Journal for Control, Measurement, Electronics, Computing and Communications, dated 2012, pp. 142-155, vol. 53. No. 2, KoREMA, Zagreb, Croatia.

G.R. Walker et al., "Photovoltaic DC-DC module integrated converter for novel cascaded and bypass grid connection topologies—Design and optimization," IEEE Power Electronics Specialists Conference, dated May 25, 2017, 7 pages, IEEE.

Y. Nimni et al., "A returned energy architecture for improved photovoltaic systems efficiency," Proceedings of 2010 IEEE International Symposium on Circuits and Systems (ISCAS), dated Aug. 3, 2010, pp. 2191-2194, IEEE.

\* cited by examiner

PHOTOVOLTAIC STRING OPTIMIZER

BACKGROUND

The present disclosure relates generally to photovoltaic (PV) string power systems. A PV string includes a plurality of PV panels, also known as solar panels, coupled together. Each PV panel converts solar energy into direct current (DC) power. A power converter, sometimes referred to as a DC-DC optimizer, a string optimizer, or a DC-DC converter, coupled to the output of the PV string may regulate the output voltage of the PV string within a range of 0V and open circuit voltage of the PV string. In order to maximize the power output of a PV string, the power converter controls the output voltage of the PV string to correspond to a maximum power point voltage, where the PV string outputs peak power given environmental conditions and other factors.

Certain PV power systems use a single power converter coupled to a plurality of PV strings to operate all PV strings at one maximum power point voltage; however, due to differences in environmental conditions or other factors between PV strings, multiple PV strings operating a one output voltage may not be outputting power at a maximum power point. Other PV power systems use a separate power converter for each PV string or each PV panel to operate each PV string at a different maximum power point voltage.

Existing PV string optimizers suffer from a number of shortcomings and disadvantages. There remain unmet needs including reducing power losses, reducing string optimizer complexity, increasing string optimizer reliability, and decreasing string optimizer costs. For example, full power converters, or converters having a rating greater than the power output by a PV string or PV string array, are used to convert all the power received from a power source, requiring expensive hardware and generating high power losses compared to partial power converter. In another example, isolation devices used by partial power converters, increase the cost and size of the string optimizer. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for photovoltaic (PV) power generation optimization. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
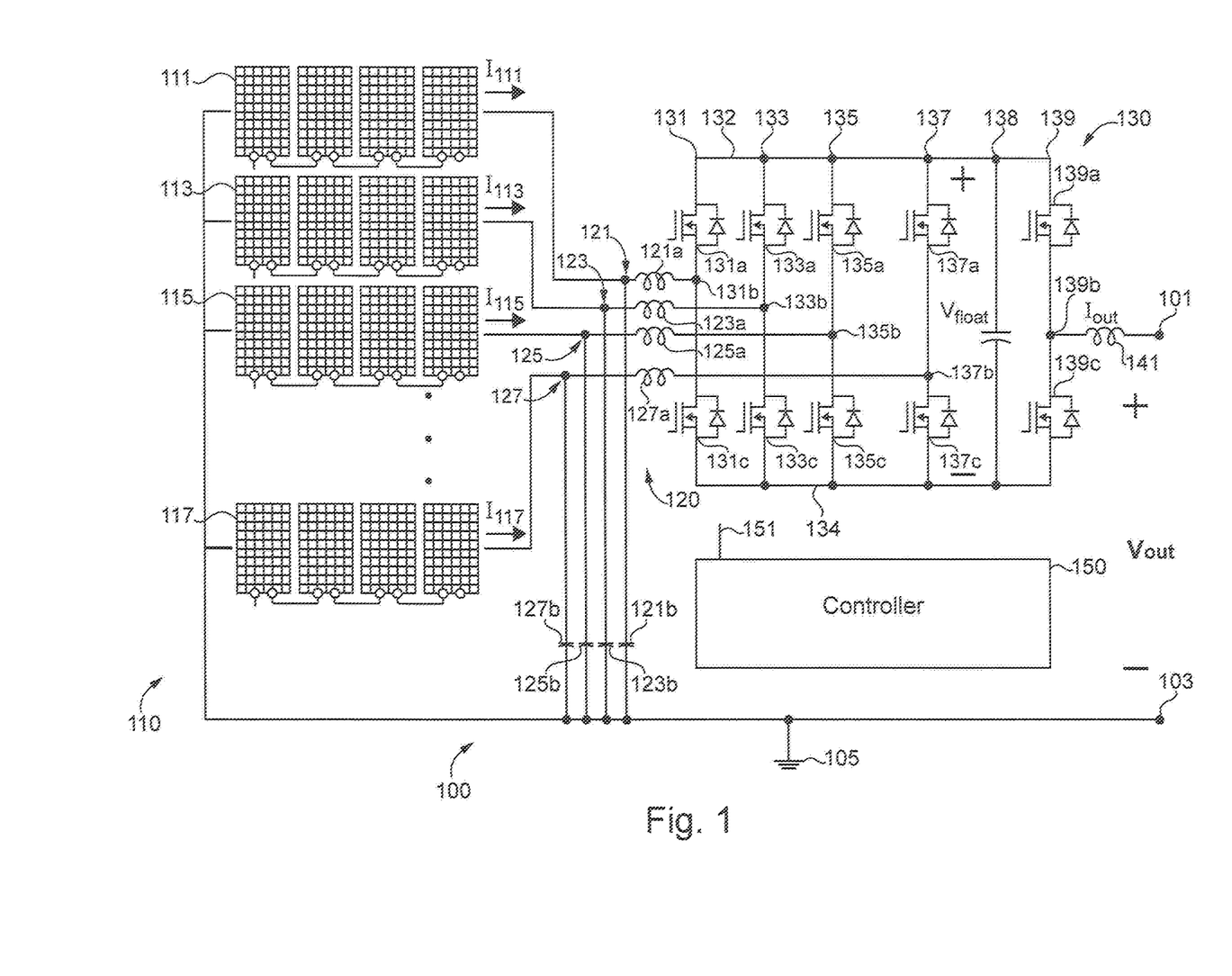
FIG. 1 is a circuit diagram illustrating an exemplary photovoltaic power system.

With reference to FIG. 1, there is illustrated an exemplary photovoltaic (PV) power system 100 including a plurality of PV strings 110 coupled to a DC-DC optimizer 130. It shall be appreciated that system 100 may be implemented in a variety of applications, including residential PV power systems or PV power plant collection systems, also known as PV farms, to name but a few examples. It shall also be appreciated that the topology of system 100 is illustrated for the purpose of explanation and is not intended as a limitation of the present disclosure. System 100 may include more or less PV strings 110, more or less PV panels in each PV string, and more or less input legs in DC-DC optimizer 130, to name but a few examples. In certain embodiments, DC-DC optimizer is integrated into a combiner box of a PV farm.

In the illustrated embodiment, the plurality of PV strings 110 includes PV string 111, PV string 113, PV string 115, and PV string 117. Each illustrated PV string includes four PV panels coupled in series. In other embodiments, the plurality of PV strings 110 may include more or less PV strings, PV strings with more or less PV panels, one PV string with a different number of PV panels compared to a second PV string, a PV string with PV panels coupled in parallel, or a PV string replaced with a single PV panel. Each PV panel of the plurality of PV strings 110 is structured to generate DC power from photovoltaic energy and output the generated DC power. In certain embodiments, one or more strings of the plurality of PV strings may be replaced by an energy storage device, such as a battery pack or capacitor bank to name but a few examples.

One end of each PV string of the plurality of PV strings 110 is coupled to ground 105 and an output terminal 103. The ends of the PV strings coupled to ground 105 are coupled together in a wye configuration. In another embodiment, the plurality of PV strings 110 are coupled to ground 105 by way of DC-DC optimizer 130 such that output terminal 101 is coupled to ground 105 instead of output terminal 103. In certain embodiments, neither output terminal 101 nor output terminal 103 is earth grounded.

A second end of each PV string of the plurality of PV strings 110 is operatively coupled to DC-DC optimizer 130 by way of a plurality of filters 120 including filters 121, 123, 125, and 127. Specifically, PV string 111 is coupled to filter 121, PV string 113 is coupled to filter 123, PV string 115 is coupled to filter 125, and PV string 117 is coupled to filter 127. In the illustrated embodiment, each filter of the plurality of filters 120 is an LC filter including an inductor and a capacitor. Filter 121 includes inductor 121a and capacitor 121b, filter 123 includes inductor 123a and capacitor 123b, filter 125 includes inductor 125a and capacitor 125b, and filter 127 includes inductor 127a and capacitor 127b. Inductor 121a is coupled between PV string 111 and DC-DC optimizer 130, capacitor 121b is coupled between PV string 111 and ground 105, inductor 123a is coupled between PV string 113 and DC-DC optimizer 130, capacitor 123b is coupled between PV string 113 and ground 105, inductor 125a is coupled between PV string 115 and DC-DC optimizer 130, capacitor 125b is coupled between PV string 115 and ground 105, inductor 127a is coupled between PV string 117 and DC-DC optimizer 130, and capacitor 127b is coupled between PV string 117 and ground 105.

The plurality of filters 120 is structured to smooth, or reduce ripple in, DC power received from the plurality of PV strings 100 with DC-DC optimizer 130. In other embodiments, the plurality of filters 120 does not include capacitors 121b, 123b, 125b, or 127b or replaces the capacitors with another type of capacitive element. In other embodiments, system 100 does not include the inductors of the plurality of filters 120 and instead operates DC-DC optimizer 130 such that line impedance, also known as parasitic impedance, of the lines coupling the plurality of PV strings 110 and DC-DC optimizer 130 is a sufficient inductive element to filter power output from the plurality of PV strings 110.

DC-DC optimizer 130 includes DC bus rails 132 and 134, neither of which are grounded. Each DC bus rail may be a single terminal or a series of coupled terminals, to name but a few examples. DC-DC optimizer 130 is structured to receive DC power from PV string 111 including current $I_{111}$, DC power from PV string 113 including current $I_{113}$, DC power from PV string 115 including current $I_{115}$, and DC power from PV string 117 including current $I_{117}$. The magnitudes of currents $I_{111}$, $I_{113}$, $I_{115}$, and $I_{117}$ are controlled by the maximum power point tracking operation of the input legs, as explained in more detail below. Operation of the input legs of DC-DC optimizer 130 generates a floating voltage $V_{float}$ across DC bus rails 132 and 134, and operation of output leg 139 outputs DC power with a voltage $V_{out}$ across system output terminals 101 and 103.

$V_{float}$ is always less than the rated voltage $V_{dc}$ of DC-DC optimizer 130. In a preferred embodiment, $V_{dc}$ is significantly less than $V_{out}$ during normal operation. For example, $V_{dc}$ of DC-DC optimizer 130 may be 120V while $V_{out}$ is 500V during normal operation. In another example, $V_{dc}$ may be equal to or less than 25% of $V_{out}$ during normal operation. In this way, DC-DC optimizer 130 only processes a fraction of the total power output by system 100, allowing the use of smaller passive components and hardware with reduced power ratings compared to a fully-rated power converter.

Voltage rating $V_{dc}$ is determined based on cost and efficiency considerations. A lower voltage $V_{dc}$ reduces the power rating requirements of the semiconductor switching devices of the input legs, but a higher voltage $V_{dc}$ allows a wider range of maximum power point voltages, resulting in higher efficiency at extreme partial shading conditions.

DC-DC optimizer 130 includes one input leg for each PV string of the plurality of PV strings 110 structured to receive DC power from the plurality of PV strings 110, step up or step down the voltage of the received DC power, and output the converted power to DC bus rails 132 and 134. In the illustrated embodiment, DC-DC optimizer 130 includes input legs 131, 133, 135, and 137. Each leg is coupled across DC bus rails 132 and 134. Leg 131 includes semiconductor switching device 131a coupled in series with semiconductor switching device 131c at midpoint connection 131b, also known as an input terminal. PV string 111 is coupled to midpoint connection 131b by way of inductor 121a. Leg 133 includes semiconductor switching device 133a coupled in series with semiconductor switching device 133c at midpoint connection 133b. PV string 113 is coupled to midpoint connection 133b by way of inductor 123a. Leg 135 includes semiconductor switching device 135a coupled in series with semiconductor switching device 135c at midpoint connection 135b. PV string 115 is coupled to midpoint connection 135b by way of inductor 125a. Leg 137 includes semiconductor switching device 137a coupled in series with semiconductor switching device 137c at midpoint connection 137b. PV string 117 is coupled to midpoint connection 137b by way of inductor 127a. In certain embodiments, one or more legs may include a multi-level topology other than the illustrated two level topology, such as a three-level neutral point clamped topology, a three level active neutral point clamped topology, a three level flying capacitor topology, or a three level cascade topology, to name but a few examples.

In the illustrated embodiment, the semiconductor switching devices of DC-DC optimizer 130 are metal oxide semiconductor field effect transistors (MOSFETs). In other embodiments, the semiconductor switching devices of DC-DC optimizer 130 may include insulated gate bipolar transistors (IGBTs), bipolar junction transistors (BJTs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of switch structured to selectively control the flow of electric current. In certain embodiments, a semiconductor switching device is coupled in an anti-parallel configuration with a freewheeling diode. In certain embodiments, the switching frequency of the semiconductor switching devices of DC-DC optimizer 130 is greater than or equal to 20 kHz.

In the illustrated embodiment, DC-DC optimizer 130 includes a floating capacitor 138 structured to reduce transients in voltage $V_{float}$ and store energy received from the plurality of input legs. Floating capacitor 138 may be replaced by a plurality of capacitors. In certain embodiments, DC-DC optimizer 130 includes an additional energy storage device coupled across DC bus rails 132 and 134. The additional energy storage device may include one or more batteries, one or more super capacitors, or a capacitor bank, to name but a few examples.

DC-DC optimizer 130 includes an output leg 139 structured to receive DC power from DC bus rails 132 and 134, step up or step down the voltage of the received power, and output the modified DC power to output terminal 101 by way of filter 141. Output leg 139 includes a semiconductor switching device 139a coupled in series with semiconductor switching device 139c at DC-DC optimizer output terminal 139b. system output terminal 101 is coupled to DC-DC optimizer output terminal 139b by way of filter 141. In certain embodiments, system 100 does not include filter 141. In certain embodiments, output terminals 101 and 103 are coupled to an inverter structured to receive DC power from output terminals 101 and 103 and convert the received DC power to AC power.

In certain embodiments, DC-DC optimizer 130 includes more than one output leg. Each output leg may be operated so as to the provide parallel current paths in order to reduce rating requirements of the semiconductor switching devices of the output legs.

In certain embodiments, system 100 includes a plurality of bypass legs, each coupled to one of the PV strings 110 and to output terminal 101, each bypass leg including a semiconductor switching device controlled by controller 150 and structured to selectively couple each PV string to output terminal 101 in response to a DC-DC optimizer 130 failure such as a malfunction within the input leg being bypassed.

System 100 includes a controller 150 coupled to the semiconductor switching devices of DC-DC optimizer 130 by way of a plurality of channels 151. Controller 150 transmits an activation signal representing a switching duty cycle to each leg of DC-DC optimizer 130 such that controller 150 may operate each leg with a different duty cycle. For example, controller 150 may operate input leg 131 with a 60% duty cycle, meaning device 131a is closed and device 131c is opened for approximately 60% of the time period of the duty cycle, following by device 131a being opened and device 131c being closed for the remainder of the time period of the duty cycle. By adjusting the duty cycle for each leg in a range from 0 to 100%, controller 150 can adjust the equivalent voltage of the phase leg in a range from 0 to $V_{dc}$. In certain embodiments, controller 150 may interleave, or shift, the times periods of the duty cycles for each leg so as to reduce power ripples on DC bus rails 132 and 134 and capacitor 138.

Controller 150 is structured to operate the semiconductor switching devices of DC-DC optimizer 130 so as to receive DC power from the plurality of PV strings 110 and output DC power to output terminal 101. As explained in more detail below, controller 150 is structured to operate the semiconductor switching devices of input legs 131, 133, 135, and 137 so as to track the maximum power point of at least one PV string of the plurality of PV strings 110. Maximum power point for each PV string may be vary due to different physical characteristics of each PV panel, such as panel construction and manufacturing tolerance, or due to changes in environmental conditions, such as irradiance level, partial shading, temperature, and panel alignment with the sun, to name but a few examples. Controller 150 is structured to operate the semiconductor switching devices of output leg 139 so as to balance the floating voltage $V_{float}$ of DC-DC optimizer 130. It shall be appreciated that any or all of the foregoing features of system 100 may also be present in the other power systems disclosed herein.

Figure 2:
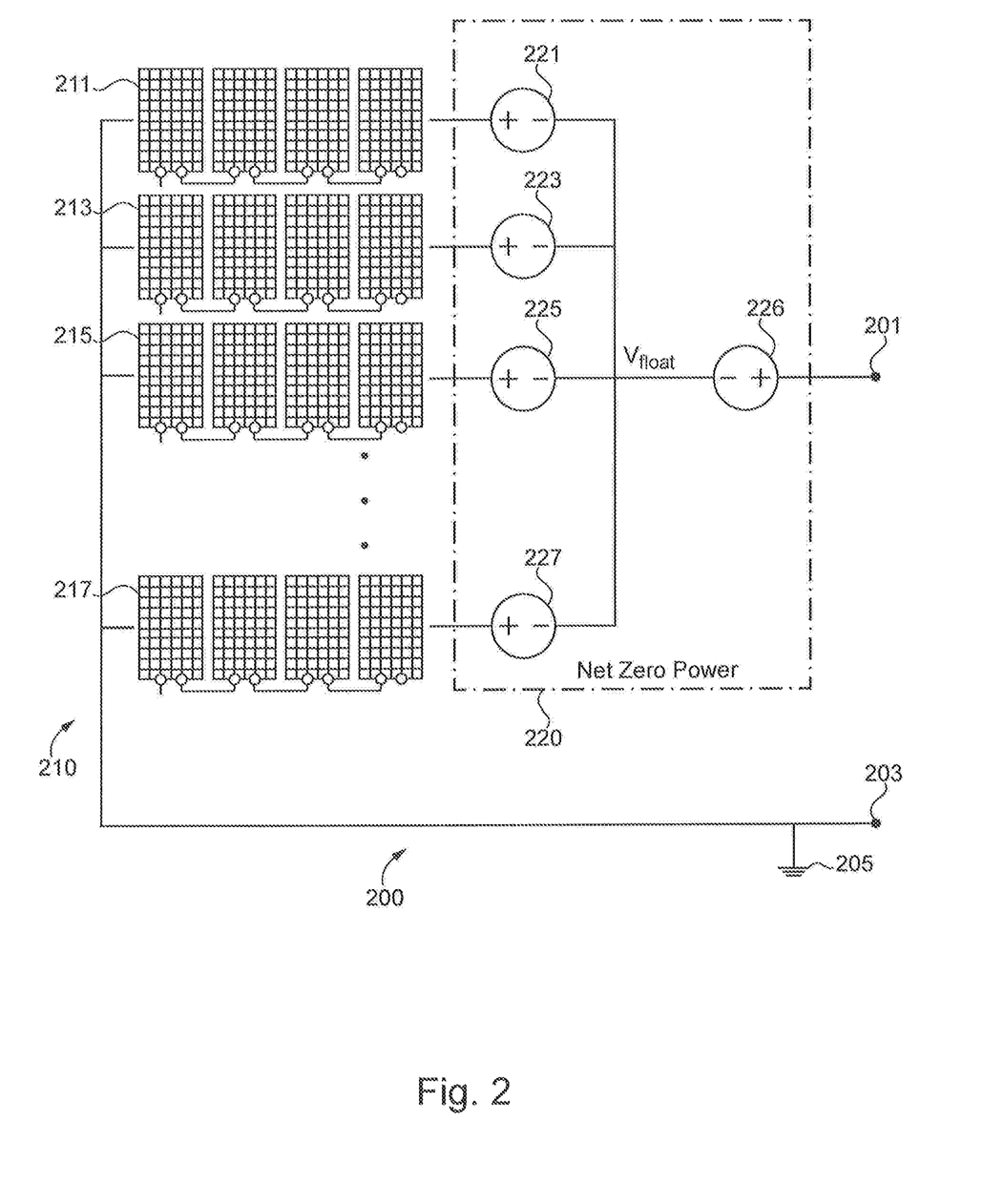
FIG. 2 is an equivalent circuit diagram illustrating the exemplary photovoltaic power system in FIG. 1.

With reference to FIG. 2, there is an equivalent circuit diagram of power system 100 illustrating voltage relationships within an exemplary power system 200. Power system 200 includes a plurality of PV strings 210 coupled to a DC-DC optimizer 220. The plurality of PV strings 210 includes PV string 211, PV string 213, PV string 215, and PV string 217. DC-DC optimizer 220 is coupled between the plurality of PV strings 210 and output terminal 201. The plurality of PV strings 210 are also coupled to a ground 205 and a second output terminal 203.

DC power received from PV string 211 includes an equivalent voltage 221. DC power received from PV string 213 includes an equivalent voltage 223. DC power received from PV string 215 includes an equivalent voltage 225. DC power received from PV string 217 includes an equivalent voltage 227. DC power transmitted to output terminal 201 by DC-DC optimizer 220 includes an equivalent voltage 226.

Each equivalent voltage 221, 223, 225, and 227 is determined by the switching operation of the input legs coupled to each PV string of the plurality of PV strings 210. Since each PV string may have a different maximum power point voltage, the duty cycles controlling each input leg may be different and the equivalent voltages of DC power received from the PV strings may also be different. When the maximum difference in equivalent voltages 221, 223, 225, and 227 is less than the rated voltage $V_{dc}$ of DC-DC optimizer 220, the input legs of DC-DC optimizer can be operated so that all input legs receive DC power from a PV string at the maximum power point of the PV string. When the maximum difference in equivalent voltages 221, 223, 225, and is greater than the rated voltage $V_{dc}$ of DC-DC optimizer 220, at least one leg will not receive DC power at a maximum power point.

In response to the maximum power point tracking operation of the input legs, DC-DC optimizer 220 controls the equivalent voltage 226 using the output leg so that the net power of DC-DC optimizer 220 is zero. The duty cycle of the output leg is controlled to ensure floating voltage $V_{float}$ is balanced.

With continuing reference to FIG. 1, in order balance voltage $V_{float}$, the average input current and average output current must be equal, as illustrated by the following equation, where $I_k$ is the average input current for the kth PV string, $D_k$ is the duty cycle for the kth input leg coupled to the kth PV string, $I_{out}$ is the average output current, and $D_{out}$ is the duty cycle of output leg 139:

$$\Sigma_{k=1}^{n}(I_k \cdot D_k) = I_{out} \cdot D_{out} \quad (1)$$

Given that:

$$I_{out} = \Sigma_{k=1}^{n} I_k \quad (2)$$

Voltage $V_{float}$ is balanced by adjusting the duty cycle of output leg 139 based on the following equation:

$$D_{out} = \frac{\sum_{k=1}^{n}(I_k \cdot D_k)}{\sum_{k=1}^{n} I_k} \quad (3)$$

Figure 3:
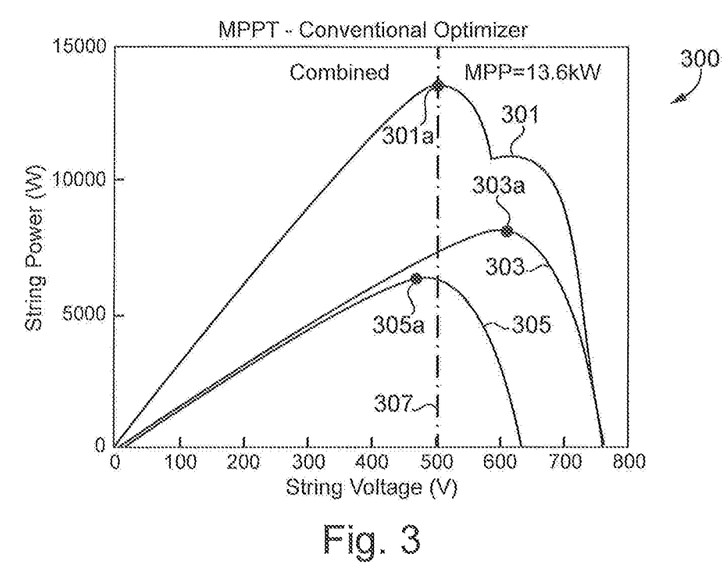
FIG. 3 is a graph illustrating, maximum power point tracking by a conventional photovoltaic power system.

With reference to FIG. 3 there is a graph 300 illustrating operation of a conventional DC-DC optimizer structured to receive power from two PV strings. Graph 300 includes a power-voltage (P-V) curve 303 for a PV string receiving full sunlight, a P-V curve 305 for a PV string experiencing 30% shading, and a combined P-V curve 301. Shading may occur, for example, when a PV string is located next to a tree casting a shadow on some of the PV panels. P-V curve 303 includes a maximum power point 303a at 610V. P-V curve 305 includes a maximum power point 305a at 490V, and combined P-V curve 301 includes a maximum power point 301a at 500V. The conventional DC-DC optimizer determines the maximum power point of the PV strings according to P-V curve 301, and therefore controls the output of each PV string so as to output DC power with an output voltage 307 of 500V. The combined output of the PV strings is 13.6 kW.

Figure 4:
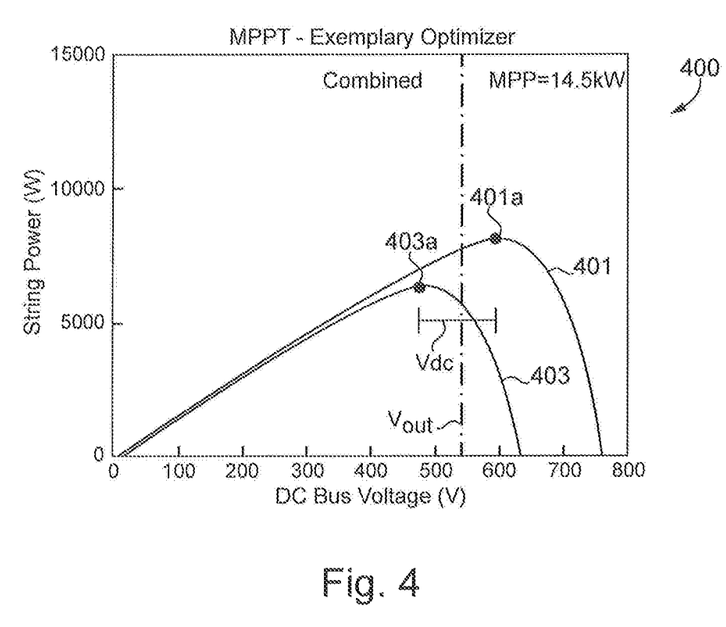
FIGS. 4-5 are graphs illustrating maximum power point tracking by an exemplary DC-DC optimizer.

With reference to FIG. 4, there is a graph 400 illustrating operation of an exemplary DC-DC optimizer, such as DC-DC optimizer 130 in FIG. 1, structured to receive DC power from two PV strings. Graph 400 includes P-V curve 401 for a PV string receiving full sunlight, P-V curve 403 for a PV string experiencing 30% shading. It is important to note P-V curve 401 is the same as P-V curve 303 in graph 300 and P-V curve 403 is the same as P-V curve 305 in graph 300. P-V curve 401 includes a maximum power point 401a at 610V. P-V curve 403 includes a maximum power point 403a at 490V.

Graph 400 also includes voltage range $V_{dc}$ representing the voltage rating of DC-DC optimizer 130, 120V. Since the difference between the voltages at maximum power points 401a and 403a is equal to 120V, controller 150 may operate the input legs coupled to each PV string so as to operate at maximum power points 401a and 403a. Graph 400 illustrates output voltage $V_{out}$ at 550V. As a result, the combined output of the PV strings is 14.5 kW, a 6.7% increase in power output compared to the conventional optimizer operation illustrated in FIG. 3.

Figure 5:
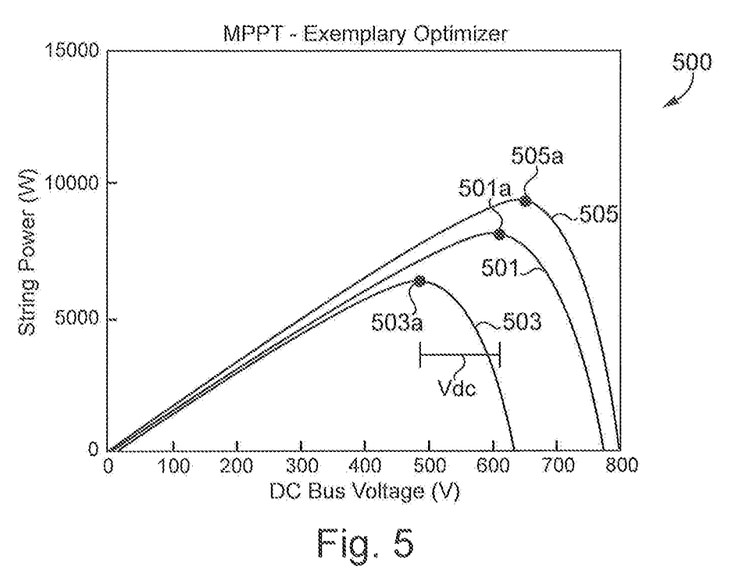

With reference to FIG. 5, there is a graph 500 illustrating operation of an exemplary DC-DC optimizer, such as DC-DC optimizer 130 in FIG. 1, structured to receive DC power from three PV strings. Graph 500 includes P-V curve 501 for a PV string receiving full sunlight, P-V curve 503 for a PV string experiencing partial shading, and P-V curve 505 for a PV string receiving full sunlight. P-V curve 501 includes a maximum power point 501a at 610V. P-V curve 503 includes a maximum power point 503a at 490V. P-V curve 505 includes a maximum power point 505a at 650V.

Graph 500 also includes voltage range $V_{dc}$ representing the voltage rating of DC-DC optimizer 130, 120V. Since the difference between the voltages at maximum power points 401a and 405a is greater than 120V, controller 150 will not track the maximum power point for each PV string. Instead, controller 150 tracks the maximum power point for the PV strings associated with curves 501 and 503, and controls the output of PV string associated with P-V curve 505 so that the output voltage is as close to maximum power point 505a as possible, in this case 610V.

In order to determine which PV strings to operate at their respective maximum power points and which PV string to operate at a point other than maximum power point, controller 150 may consider a plurality of operating point combinations and calculate an estimated combined power output. Controller 150 then selects which PV strings to operate at maximum power point and which PV strings to operate at a different point within the operating point range defined by $V_{dc}$ using the combination with the highest estimated combined power output.

Further written description of a number of exemplary embodiments shall now be provided. One embodiment is a photovoltaic (PV) power system comprising: a plurality of PV strings each including a first end and a second end, the first end of each PV string of the plurality of PV strings being coupled together; and a floating DC-DC optimizer comprising: a first DC bus rail, a second DC bus rail, a plurality of input legs, each leg being coupled across the first DC bus rail and second DC bus rail, including two input leg semiconductor switches coupled at an input terminal, each input terminal being structured to receive an input current from the second end of one PV string of the plurality of PV strings, and an output leg including two output leg semiconductor devices coupled at an output terminal.

In certain forms of the foregoing PV power system, the system comprises a plurality of filters, wherein each filter is coupled between one second end of one PV string of the plurality of PV strings and the input terminal of one input leg of the plurality of input legs. In certain forms, the first end of each PV string in the plurality of PV strings are coupled to a ground. In certain forms, the floating DC-DC optimizer includes a capacitor coupled across the first DC bus rail and the second DC bus rail, wherein a controller is structured to operate the two input leg semiconductor switches of the plurality of input legs and the two output leg semiconductor switches effective to balance a floating DC voltage across the capacitor. In certain forms, the plurality of PV strings includes a first PV string and a second PV string and the plurality of input legs includes a first input leg coupled to the first PV string and a second input leg coupled to the second PV string, wherein the controller is structured to operate the two input semiconductor switches of the first input leg so as to receive DC power from the first PV string with a first voltage corresponding to a maximum power point voltage of the first PV string, wherein the controller is structured to operate the two input semiconductor switches of the second input leg so as to receive DC power from the second PV string with a second voltage corresponding to a maximum power point voltage of the second PV string, and wherein the first voltage is not equal to the second voltage. In certain forms, the floating DC voltage is less than a rated DC voltage of the floating DC-DC optimizer, and wherein the rated DC voltage of the floating DC-DC optimizer is less than or equal to 25% of an output voltage across the output terminal and the first ends of the plurality of PV strings during normal operation. In certain forms, the plurality of PV strings includes a third PV string and the plurality of input legs includes a third input leg coupled to the third PV string, wherein the controller is structured to operate the two input semiconductor switches of the third input leg so as to receive DC power from the third PV string with a third voltage not corresponding to a maximum power point of the third PV string, wherein the difference between the first voltage and the second voltage is less than the rated DC voltage, but the difference between the first voltage and third voltage is greater than the rated DC voltage. In certain forms, the controller is structured to balance the floating DC voltage by operating the two output leg semiconductor switches such that a sum of the input currents received by each input leg is equal to an output current output at the output terminal. In certain forms, the controller is structured to operate the two input semiconductor switches of the first input leg in an interleaved manner relative to the two input semiconductor switches of the second input leg. In certain forms, the controller is structured to operate the two output semiconductor switches using a first duty cycle equal to sum of the average input current multiplied by the duty cycle for each input leg divided by the sum of the average input currents. In certain forms, the system comprises an energy storage device including a first end coupled to the first ends of the plurality of PV strings, wherein the DC-DC optimizer includes an energy storage device input leg including an input terminal, wherein the energy storage device input leg is coupled to the energy storage device and the first and second DC bus rail, and wherein a controller is structured to operate the energy storage device input leg so as to provide the first and second DC bus rail with power from the energy storage device. In certain forms, the DC-DC optimizer includes a plurality of bypass legs each coupled between one input terminal of one input leg of the plurality of input legs and the output terminal, wherein a controller is structured to allow current to flow through one of the bypass legs in response to detecting a fault within the bypassed input leg of the DC-DC optimizer.

Another exemplary embodiment is a floating DC-DC optimizer comprising: a plurality of input legs coupled in parallel, each including two input semiconductor switching devices coupled at an input terminal, and structured to receive DC power from a PV string at each input terminal; an ungrounded floating capacitor coupled in parallel with the plurality of input legs; and an output leg coupled in parallel with the floating capacitor and including two output semiconductor switching devices coupled at an output terminal.

In certain forms of the foregoing DC-DC optimizer, the optimizer comprises a controller structured to operate the two input semiconductor switching devices of each input leg of the plurality of input legs and the two output semiconductor switching devices effective to balance a total input current received with the DC-DC optimizer and an output current output by the DC-DC optimizer. In certain forms, the controller is structured to operate the two output semiconductor switches using a first duty cycle equal to sum of the average input current multiplied by the duty cycle for each input leg divided by the sum of the average input currents. In certain forms, the plurality of input legs includes a first input leg coupled to a first PV string including a first maximum power point voltage, a second input leg coupled to a second PV string including a second maximum power point voltage, and a third PV string coupled to a third PV string including a third maximum power point voltage, wherein the DC-DC optimizer is structured to operate the plurality of input legs at a rated voltage, and wherein the controller operates the first input leg at the first maximum power point voltage, the second input leg at the second maximum power point voltage, and the third string at an output voltage other than the third maximum power point voltage, and wherein the difference between the first maximum power point voltage and the third maximum power point voltage is greater than the rated voltage. in certain forms, the two semiconductor switching devices of each input leg include gallium nitride or silicon carbide switching devices, and wherein the controller is structured to filter the DC power received from the PV strings using a switching frequency of the two semiconductor switching devices of each input leg. In certain forms, the controller operates each input leg by transmitting activation signals including duty cycles to each input semiconductor switching devices, and wherein a first duty cycle of a first input leg is time-shifted relative to a second duty cycle of a second input leg. In certain forms, the optimizer comprises an energy storage device input leg including an input terminal, wherein the energy storage device input leg is coupled to an energy storage device, and wherein a controller is structured to operate the energy storage device input leg so as to receive power from the energy storage device. In certain forms, the DC-DC optimizer includes a plurality of bypass legs each coupled between one input terminal of one PV string the output terminal, wherein a controller is structured to allow current to flow through one of the bypass legs in response to detecting a fault within the bypassed input leg of the DC-DC optimizer.

A further exemplary embodiment is a method for generating DC power comprising: operating a floating DC-DC optimizer including a DC bus, a plurality of controllable input legs coupled across the DC bus, a floating capacitor coupled across the DC bus, and a controllable output leg, each of the controllable input legs being coupled to one PV string of a plurality of PV strings; tracking a first maximum power point voltage of a first PV string of the plurality of PV strings using a first controllable input leg of the plurality of controllable input legs coupled to the first PV string; tracking a second maximum power point voltage of a second PV string of the plurality of PV strings using a second controllable input leg of the plurality of controllable input legs, the second maximum power point voltage being different that the first maximum power point voltage; and balancing a voltage across the DC bus using the controllable output leg.

In certain forms of the foregoing method, the method comprises determining a rated voltage of the floating DC-DC optimizer; determining a difference between a third maximum power point voltage of a third PV string of the plurality of PV strings and the first maximum power point voltage is greater than a rated voltage of the floating DC-DC optimizer; and operating a controllable third input leg of the plurality of controllable input legs at a first voltage within the rated voltage of the first maximum power point and within the rated voltage value of the second maximum power point. In certain forms, the rated voltage is equal to or less than 25% of a voltage across the plurality of PV strings and an output terminal of the output leg. In certain forms, balancing the voltage across the DC bus comprises: measuring an input current from each PV string of the plurality of PV strings; calculating an output leg duty cycle using the measured input currents; and operating the controllable output leg using the output leg duty cycle. In certain forms, calculating the output leg duty cycle using the measured currents comprising: determining an input leg duty cycle for each controllable input leg of the plurality of controllable input legs; generating a set of current values by multiplying the corresponding input current measurement and the input leg duty cycle; calculating a sum of the set of current values; and dividing the sum of the set of current values by the sum of the measured input currents. In certain forms, the first controllable input leg is operated in an interleaved manner relative to the second controllable input leg.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A photovoltaic (PV) power system comprising:
    a plurality of PV strings each including a first end and a second end, the first end of each PV string of the plurality of PV strings being coupled together; and
    a floating DC-DC optimizer comprising:
        a first DC bus rail,
        a second DC bus rail,
        a plurality of input legs, each leg being coupled across the first DC bus rail and second DC bus rail, including two input leg semiconductor switches coupled in series at a midpoint connection forming an input terminal, each input terminal being structured to receive an input current from the second end of one PV string of the plurality of PV strings, and an output leg including two output leg semiconductor devices coupled in series at an output terminal.

2. The photovoltaic power system of claim 1 comprising a plurality of filters, wherein each filter is coupled between one second end of one PV string of the plurality of PV strings and the input terminal of one input leg of the plurality of input legs.

3. The photovoltaic power system of claim 1 wherein the first end of each PV string in the plurality of PV strings are coupled to a ground.

4. The photovoltaic power system of claim 3 wherein the floating DC-DC optimizer includes a capacitor coupled across the first DC bus rail and the second DC bus rail, wherein a controller is structured to operate the two input leg semiconductor switches of the plurality of input legs and the two output leg semiconductor switches effective to balance a floating DC voltage across the capacitor.

5. The photovoltaic power system of claim 4 wherein the plurality of PV strings includes a first PV string and a second PV string and the plurality of input legs includes a first input leg coupled to the first PV string and a second input leg coupled to the second PV string, wherein the controller is structured to operate the two input semiconductor switches of the first input leg so as to receive DC power from the first PV string with a first voltage corresponding to a maximum power point voltage of the first PV string, wherein the controller is structured to operate the two input semiconductor switches of the second input leg so as to receive DC power from the second PV string with a second voltage corresponding to a maximum power point voltage of the second PV string, and wherein the first voltage is not equal to the second voltage.

6. The photovoltaic power system of claim 5 wherein the floating DC voltage is less than a rated DC voltage of the floating DC-DC optimizer, and wherein the rated DC voltage of the floating DC-DC optimizer is less than or equal to 25% of an output voltage across the output terminal and the first ends of the plurality of PV strings during normal operation.

7. The photovoltaic power system of claim 6 wherein the plurality of PV strings includes a third PV string and the plurality of input legs includes a third input leg coupled to the third PV string, wherein the controller is structured to operate the two input semiconductor switches of the third input leg so as to receive DC power from the third PV string with a third voltage not corresponding to a maximum power point of the third PV string, wherein the difference between the first voltage and the second voltage is less than the rated DC voltage, but the difference between the first voltage and third voltage is greater than the rated DC voltage.

8. The photovoltaic power system of claim 4 wherein the controller is structured to balance the floating DC voltage by operating the two output leg semiconductor switches such that a sum of the input currents received by each input leg is equal to an output current output at the output terminal.

9. The photovoltaic power system of claim 5 wherein the controller is structured to operate the two input semiconductor switches of the first input leg in an interleaved manner relative to the two input semiconductor switches of the second input leg.

10. The photovoltaic power system of claim 4 wherein the controller is structured to operate the two output semiconductor switches using a first duty cycle equal to sum of the average input current multiplied by the duty cycle for each input leg divided by the sum of the average input currents.

11. The photovoltaic power system of claim 1 comprising an energy storage device including a first end coupled to the first ends of the plurality of PV strings, wherein the DC-DC optimizer includes an energy storage device input leg including an input terminal, wherein the energy storage device input leg is coupled to the energy storage device and the first and second DC bus rail, and wherein a controller is structured to operate the energy storage device input leg so as to provide the first and second DC bus rail with power from the energy storage device.

12. The photovoltaic power system of claim 1 wherein the DC-DC optimizer includes a plurality of bypass legs each coupled between one input terminal of one input leg of the plurality of input legs and the output terminal, wherein a controller is structured to allow current to flow through one of the bypass legs in response to detecting a fault within the bypassed input leg of the DC-DC optimizer.

13. A floating DC-DC optimizer comprising:

a plurality of input legs coupled in parallel, each including two input semiconductor switching devices coupled in series at a midpoint connection providing at an input terminal, and structured to receive DC power from a PV string at each input terminal;

an ungrounded floating capacitor coupled in parallel with the plurality of input legs; and an output leg coupled in parallel with the floating capacitor and including two output semiconductor switching devices coupled at an output terminal.

14. The floating DC-DC optimizer of claim 13 comprising a controller structured to operate the two input semiconductor switching devices of each input leg of the plurality of input legs and the two output semiconductor switching devices effective to balance a total input current received with the DC-DC optimizer and an output current output by the DC-DC optimizer.

15. The floating DC-DC optimizer of claim 14 wherein the controller is structured to operate the two output semiconductor switches using a first duty cycle equal to sum of the average input current multiplied by the duty cycle for each input leg divided by the sum of the average input currents.

16. The floating DC-DC optimizer of claim 14 wherein the plurality of input legs includes a first input leg coupled to a first PV string including a first maximum power point voltage, a second input leg coupled to a second PV string including a second maximum power point voltage, and a third PV string coupled to a third PV string including a third maximum power point voltage, wherein the DC-DC optimizer is structured to operate the plurality of input legs at a rated voltage, and wherein the controller operates the first input leg at the first maximum power point voltage, the second input leg at the second maximum power point voltage, and the third string at an output voltage other than the third maximum power point voltage, and wherein the difference between the first maximum power point voltage and the third maximum power point voltage is greater than the rated voltage.

17. The floating DC-DC optimizer of claim 16 wherein the two semiconductor switching devices of each input leg include gallium nitride or silicon carbide switching devices, and wherein the controller is structured to filter the DC power received from the PV strings using a switching frequency of the two semiconductor switching devices of each input leg.

18. The floating DC-DC optimizer of claim 16 wherein the controller operates each input leg by transmitting activation signals including duty cycles to each input semiconductor switching devices, and wherein a first duty cycle of a first input leg is time-shifted relative to a second duty cycle of a second input leg.

19. The floating DC-DC optimizer of claim 13 comprising an energy storage device input leg including an input terminal, wherein the energy storage device input leg is coupled to an energy storage device, and wherein a controller is structured to operate the energy storage device input leg so as to receive power from the energy storage device.

20. The floating DC-DC optimizer of claim 11 wherein the DC-DC optimizer includes a plurality of bypass legs each coupled between one input terminal of one PV string the output terminal, wherein a controller is structured to allow current to flow through one of the bypass legs in response to detecting a fault within the bypassed input leg of the DC-DC optimizer.

21. A method for generating DC power comprising:
operating a floating DC-DC optimizer including a DC bus, a plurality of controllable input legs coupled across the DC bus, the plurality of input legs including two input leg semiconductor switches coupled in series at a midpoint connection, a floating capacitor coupled across the DC bus, and a controllable output leg, each of the controllable input legs being coupled to one PV string of a plurality of PV strings;
tracking a first maximum power point voltage of a first PV string of the plurality of PV strings using a first controllable input leg of the plurality of controllable input legs coupled to the first PV string;
tracking a second maximum power point voltage of a second PV string of the plurality of PV strings using a second controllable input leg of the plurality of controllable input legs, the second maximum power point voltage being different that the first maximum power point voltage; and
balancing a voltage across the DC bus using the controllable output leg.

22. The method of claim 21 comprising:
determining a rated voltage of the floating DC-DC optimizer;
determining a difference between a third maximum power point voltage of a third PV string of the plurality of PV strings and the first maximum power point voltage is greater than a rated voltage of the floating DC-DC optimizer; and
operating a controllable third input leg of the plurality of controllable input legs at a first voltage within the rated voltage of the first maximum power point and within the rated voltage value of the second maximum power point.

23. The method of claim 22 wherein the rated voltage is equal to or less than 25% of a voltage across the plurality of PV strings and an output terminal of the output leg.

24. The method of claim 21 wherein balancing the voltage across the DC bus comprises:
measuring an input current from each PV string of the plurality of PV strings;
calculating an output leg duty cycle using the measured input currents; and
operating the controllable output leg using the output leg duty cycle.

25. The method of claim 24 wherein calculating the output leg duty cycle using the measured currents comprising:
determining an input leg duty cycle for each controllable input leg of the plurality of controllable input legs;
generating a set of current values by multiplying the corresponding input current measurement and the input leg duty cycle;
calculating a sum of the set of current values; and
dividing the sum of the set of current values by the sum of the measured input currents.

26. The method of claim 21 wherein the first controllable input leg is operated in an interleaved manner relative to the second controllable input leg.

* * * * *